United States Patent [19]

Schucker et al.

[11] Patent Number: 4,469,590
[45] Date of Patent: Sep. 4, 1984

[54] PROCESS FOR THE HYDROGENATION OF AROMATIC HYDROCARBONS

[75] Inventors: Robert C. Schucker; Kenneth S. Wheelock, both of Baton Rouge, La.

[73] Assignee: Exxon Research and Engineering Co., Florham Park, N.J.

[21] Appl. No.: 505,213

[22] Filed: Jun. 17, 1983

[51] Int. Cl.³ .................... C10G 45/08; C10G 45/10
[52] U.S. Cl. .................... 208/143; 585/264; 585/266; 585/269; 585/277; 208/212; 208/89
[58] Field of Search ............ 208/143, 264; 585/250, 585/264, 266, 269, 275; 502/238, 246, 257, 262, 311, 320, 327, 333, 334, 339

[56] References Cited

U.S. PATENT DOCUMENTS

| | | | |
|---|---|---|---|
| 3,201,345 | 8/1965 | Hamilton et al. | 208/143 |
| 3,313,859 | 4/1967 | Doane | 208/143 |
| 3,491,019 | 1/1970 | Pollitzer et al. | |
| 3,655,551 | 4/1972 | Hass et al. | |
| 3,788,976 | 1/1974 | Kirk | 208/264 |
| 4,269,737 | 5/1981 | Grenoble et al. | |
| 4,330,395 | 5/1982 | Pott et al. | 208/143 |
| 4,366,047 | 12/1982 | Winter et al. | 208/264 |

Primary Examiner—Delbert E. Gantz
Assistant Examiner—Anthony McFarlane
Attorney, Agent, or Firm—Marthe L. Gibbons

[57] ABSTRACT

A process for the hydrogenation of aromatic hydrocarbons contained in a hydrocarbonaceous oil feed is provided in which the feed is contacted with hydrogen in a substantially sulfur-free environment in the presence of a catalyst comprising a Group VIII noble metal component, such as palladium, deposited on a steamed support such as steamed tungsten oxide composited with alumina.

12 Claims, 1 Drawing Figure

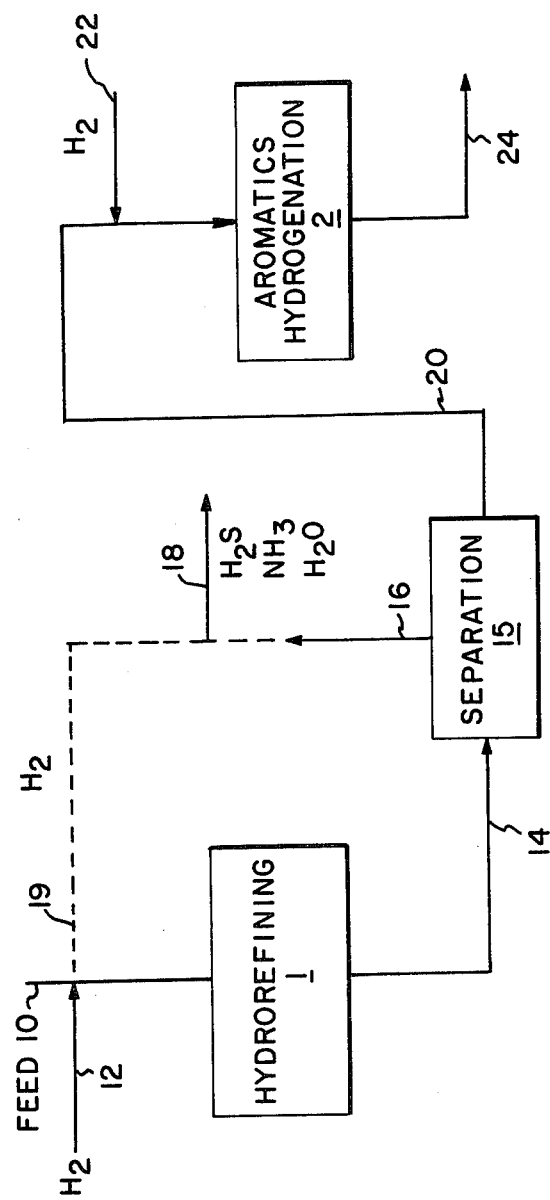

PROCESS FOR THE HYDROGENATION OF AROMATIC HYDROCARBONS

BACKGROUND OF THE INVENTION

1. Field of the Invention

The present invention relates to a process for the hydrogenation of aromatic hydrocarbons.

2. Description of the Prior Art

Hydrogenation processes in which aromatic compounds alone or contained in hydrocarbonaceous oils are hydrogenated in the presence of hydrogen and a suitable catalyst are known.

U.S. Pat. No. 3,655,551 discloses that Group VIII noble metals, such as palladium or platinum, on zeolites exhibit high hydrogenation activity such that if a substantially sulfur-free atmosphere is maintained, effective hydrogenation of aromatics can occur at 200° to 500° F., pressures of 500 to 3000 psig and a space velocity of 0.5 to 2.0 and those conditions may be correlated such that little or no cracking occurs.

U.S. Pat. No. 4,269,737 discloses a method of preparing a catalyst comprising a Group IVB, Group VB or VIB metal oxide on an inorganic oxide support, for example, tungsten oxide on an alumina-containing support, in which the catalyst is steamed at a temperature ranging from about 600° to about 1200° C. prior to use in acid hydrocarbon conversion processes. See also U.S. Pat. No. 4,233,139.

U.S. Pat. No. 3,491,019 discloses the hydrogenation of polynuclear aromatics contained in a light cycle oil using a catalyst comprising a metal of Group IVB and a metal of Group VIII deposited on silica-alumina. In column 2, lines 54 to 69, tungsten and palladium are listed among a number of Group VIB and Group VIII metals.

SUMMARY OF THE INVENTION

In accordance with the invention there is provided, a process for the hydrogenation of aromatic hydrocarbons, which comprises: contacting said aromatic hydrocarbons, at hydrogenation conditions, in a hydrogenation zone, in the presence of added hydrogen and in the substantial absence of an inorganic sulfur compound, with a catalyst comprising (a) a noble metal component of Group VIII of the Periodic Table of Elements, and (b) a steamed support comprising a transition metal oxide composited with a non-zeolitic inorganic oxide, said transition metal oxide being selected from the group consisting of tungsten oxide, niobium oxide and mixtures thereof.

BRIEF DESCRIPTION OF THE DRAWING

The FIGURE is a schematic flow plan of one embodiment of the invention.

DETAILED DESCRIPTION OF THE INVENTION

Feeds

The hydrogenation process of the present invention is suitable to hydrogenate a single type or a mixture of types of pure aromatic hydrocarbons as well as for the hydrogenation of aromatic hydrocarbons contained in a mixture of hydrocarbons such as hydrocarbonaceous oil feeds. The aromatic-containing hydrocarbonaceous oils may be derived from any source such as petroleum, shale oil, tar sand oil, coal liquefaction products and mixtures thereof. Preferably, the hydrocarbonaceous oil feed comprises at least about 20 weight percent aromatic compounds. Suitable aromatic-containing hydrocarbonaceous oils include oils having atmospheric pressure boiling point ranging from about 300° to about 1050° F., preferably from about 450° to 1050° F. More preferably, the feeds used for the hydrogenation stage of the present invention have a low organic nitrogen content, for example, under 10 wppm nitrogen and a low organic sulfur content under 0.1 weight percent sulfur, as organic sulfur compounds. If the organic nitrogen and the organic sulfur content are not low enough, the nitrogen and sulfur content can be lowered by pretreating the hydrocarbonaceous oils utilizing a hydrotreating catalyst and hydrogen at hydrotreating conditions and using the hydrotreated oil as feed for the aromatic hydrogenation stage of the present invention.

The Aromatics Hydrogenation Catalyst

The catalyst used in the aromatic hydrogenation stage of the present invention comprises a Group VIII noble component deposited on a steamed support comprising a transition metal oxide composited with a non-zeolitic inorganic oxide. By "noble metal" is intended herein a metal of Group VIII of the Periodic Table of Elements selected from the Group consisting of Ru, Rh, Pd, Os, Ir, Pt and mixtures thereof. The Periodic Table of Elements referred to herein is in accordance with the *Handbook of Chemistry and Physics*, Chemical Rubber Publishing Company, Cleveland, Ohio, 45th Edition. Suitable transition metal oxides include tungsten oxide, niobium oxide and mixtures thereof which may be used alone or in combination with an additional metal oxide selected from the group consisting of tantalum oxide, hafnium oxide, chromium oxide, titanium oxide, zirconium oxide and mixtures thereof. Preferably, the transition metal oxide is tungsten oxide. The transition metal oxide is composited with a non-zeolitic inorganic oxide component. Desirably, the non-zeolitic inorganic oxide will have a high surface area, such as a surface area ranging from about 20 to 500 m$^2$/g, preferably from about 40 to 200 m$^2$/g, more preferably above about 100 m$^2$/g, as measured by the method of Brunauer-Emmett-Teller (BET). Suitable non-zeolitic inorganic oxide components include silica, magnesia, alumina, boria, and mixtures thereof. Clays comprising silica and alumina and acid treated clays may also be used as non-zeolitic inorganic oxide component. Preferably, the non-zeolitic inorganic oxide component is an alumina-containing component which may additionally comprise a minor amount of silica.

In accordance with the present invention, the above-defined transition metal oxide composited with a non-zeolitic inorganic oxide must be steam treated prior to compositing it with a Group VIII noble metal component. Thus, a transition metal oxide composited with a non-zeolitic inorganic oxide which may be considered the support for the noble metal, are subjected to steam treatment at a temperature which may suitably range from about 932° F. to 2192° F., (500° to 1200° C.) preferably from about 1112° F. to 2192° F., (600° C. to 1200° F.), more preferably from about 1472° F. to 2192° F. (800° C. to 1200° C.) in an atmosphere of steam, for example, ranging from about 0.1 to 100% steam for 0.1 to 60 hours, preferably for about 1 to 16 hours. The pressure is not critical and may range from subatmospheric to superatmospheric pressure. Preferably, the steaming is performed at atmospheric pressure. A preferred steam treatment is described in U.S. Pat. No. 4,269,737, the teachings of which are hereby incorporated by reference. The Group VIII noble metal component may be composited with the steamed transition metal oxide-non-zeolitic metal oxide support using any known method in the art such as impregnation, vapor phase deposition, etc. The method is not critical except in that the noble metal component must be composited with the pre-steamed transition metal oxide-non-zeolitic metal oxide. The transition metal oxide with the non-zeolitic metal oxide is considered herein the support for the noble metal component although the so designated support has catalytic activity. The noble metal component, calculated as elemental metal may be present in the catalyst from about 0.1 to about 10 weight percent, preferably from about 0.5 to about 5 weight percent based on total catalyst. The transition metal oxide component may be present from about 0.1 to about 50 weight percent, preferably from about 0.1 to about 30 weight percent based on the total catalyst. A preferred catalyst comprises palladium deposited on steamed tungsten oxide composited with a gamma alumina-containing material in which palladium is present in an amount ranging from about 0.1 to 10 weight percent, preferably from about 0.5 to about 5 weight percent, calculated as elemental metal, and a tungsten oxide is present in an amount ranging from about 0.1 to 50 weight percent, preferably from about 0.1 to 30 weight percent, calculated as tungsten oxide, based on a total catalyst. The most preferred catalyst comprises about 0.5 weight percent palladium, about 9 weight percent tungsten oxide, and the balance being alumina. A preferred alumina is gamma alumina. The catalyst may additionally comprise other catalytic components or inert components.

Suitable aromatic hydrogenation conditions are summarized in Table I.

TABLE I

| Hydrogenation Conditions | | |
|---|---|---|
| Conditions | Broad Range | Preferred Range |
| Temperature, °F. | 200–600 | 350–500 |
| Total Pressure, psia | 200–2500 | 1200–2000 |
| Liquid Hourly Space Velocity, (V/V/HR) | 0.4–7.0 | 1.5–4.0 |
| Hydrogen Rate SCF/BBL | 200–50,000 | 4000–8000 |

The hydrogenation zone is substantially free of inorganic sulfur compounds such as hydrogen sulfide. By "substantially hydrogen sulfide free" is intended herein a hydrogen sulfide partial pressure of less than about 0.5 psia.

The catalyst of the present invention may be disposed in a fixed bed, moving bed, ebullating bed, fluidized bed, dispersed phase (transferline), slurry process, etc.

DESCRIPTION OF THE PREFERRED EMBODIMENT

Referring to the figure, the hydrocarbonaceous oil feed comprising aromatic compounds, organic sulfur compounds and organic nitrogen compounds is passed by line 10 in admixture with a hydrogen-containing gas introduced by line 12 into hydrorefining stage 1 in which is maintained a conventional hydrorefining catalyst. The hydrorefining stage is used herein as a pretreatment stage to decrease the sulfur and nitrogen content of the oil as well as to hydrogenate diolefins that may be present in the oil. Suitable operating conditions in the hydrorefining stage are summarized in Table II.

TABLE II

| Hydrorefining Operating Conditions | | |
|---|---|---|
| Conditions | Broad Range | Preferred Range |
| Temperature, °F. | 400–800 | 500–700 |
| Total Pressure, psia | 50–2500 | 60–1500 |
| Liquid Hourly Space Velocity, V/V/HR | 0.05–20 | 0.1–2.5 |
| Hydrogen Rate, SCF/BBL | 200–15,000 | 4,000–8,000 |

The hydrogen-containing gas introduced into feed line 10 by line 12 may be a fresh hydrogen-containing gas at the start of the process or it may a hydrogen-containing gas recovered from the process, i.e. recycled hydrogen-containing gas from which hydrogen sulfide contaminants have been removed.

The Hydrorefining Catalyst

The hydrorefining stage catalyst may be any conventional hydrorefining catalyst that does not comprise a noble metal component. Hydrorefining catalysts generally comprise a hydrogenation component and a support. Suitable hydrorefining catalysts for the hydrorefining stage of the present invention comprise a Group VIB metal component or a non-noble metal component of Group VIII and mixtures thereof of the Periodic Table of Elements, such as cobalt, molybdenum, nickel, tungsten and mixtures thereof, preferably their sulfides, their oxides and mixtures thereof. Suitable supports include inorganic oxides such as alumina, amorphous silica-alumina, zirconia, magnesia, boria, titania, chromia, beryllia, and mixtures thereof. Preferably, the support will be non-zeolitic, although low zeolite content catalyst having less than 20 weight percent zeolite on total catalyst may also be used such as those described, for example, in U.S. Pat. No. 3,865,716. The preferred catalyst comprises sulfides of nickel and molybdenum composited with an alumina support. When the hydrogenation component is in the oxide state, the catalyst may be sulfided prior to use, as is known in the art. The hydrorefining stage effluent is passed by line 14 into separation zone 15 in which the effluent is separated into a normally gaseous product comprising hydrogen, hydrogen sulfide, ammonia, and $H_2O$, and which may also comprise light hydrocarbons, and a normally liquid hydrocarbonaceous oil which comprises aromatics initially present in the feed to the hydrorefining stage as well as aromatics that may have been produced in the hydrorefining stage. The gaseous product is removed by line 16. If desired, after removal of hydrogen sulfide and ammonia by conventional means as is well-known in the art, the hydrogen-containing gas may be recycled via line 19 to feed line 10 for reintroduction into the hydrorefining stage. The hydrorefined normally liquid hydrocarbonaceous oil is removed from separation zone 15 by line 20.

At least a portion of the hydrorefined oil recovered from separation zone 15 is passed by line 20 into aromatic hydrogenation stage 2. The hydrogen-containing gas is introduced into line 20 by line 22. This gas may be a substantially $H_2S$-free recycle gaseous stream recovered from the process or it may be a fresh hydrogen-containing gas which is substantially $H_2S$-free. A catalyst is maintained in hydrogenation stage 2. The catalyst comprises a palladium component (as hydrogenation component) composited with a steamed tungsten oxide on alumina. The alumina may comprise a minor amount of silica. The weight percent composition of the components of the catalyst, which is the preferred catalyst of the present invention, is as follows: 0.5 weight percent palladium component, calculated as elemental metal; 9.05 weight percent tungsten oxide, and 90.45 weight percent alumina, all of the weights being based on the weight of the total catalyst.

Suitable operating conditions in aromatics hydrogenation stage 2 to maximize hydrogenation of aromatic hydrocarbons to aliphatic hydrocarbons, such as, for example, cycloalkanes (e.g. naphthenes) are summarized in Table III.

TABLE III

| Sweet Hydrogenation Conditions | | |
|---|---|---|
| Conditions | Broad Range | Preferred Range |
| Temperature, °F. | 200–600 | 350–500 |
| Total Pressure, psia | 200–2,500 | 1,200–2,000 |
| Liquid Hourly Space Velocity, V/V/HR | 0.4–7 | 1.5–4.0 |
| Hydrogen Rate, SCF/BBL | 200–50,000 | 400–8,000 |
| $NH_3$ Partial Pressure, psia | Less than 0.5 | Less than 0.02 |
| $H_2S$ Partial Pressure, psia | Less than 0.5 | Less than 0.01 |
| $H_2$ Partial Pressure, psia | 150–2,000 | 900–1,500 |

The hydrogenation stage is operated substantially free of hydrogen sulfide and preferably free of ammonia, that is, under so-called "sweet" conditions to maximize hydrogenation of aromatics present in the oil and under conditions to minimize cracking of the oil to lower boiling products, that is, for example to convert less than 20 volume percent of the oil of the second stage to products boiling below 350° F. The effluent of the hydrogenation stage is removed by line 24. The hydrogenation stage effluent comprises a gaseous phase, including hydrogen, which may be recycled to the second or first stage of the process and a liquid hydrogenated oil product having a decreased amount of aromatics relative to the aromatics that were present in the oil introduced into hydrogenation stage 2.

The following examples are presented to illustrate the invention.

Preparation and Evaluation of the Steamed Support

Twenty-six and seventeen hundredths grams (26.17 g) of technical grade ammonium metatungstate [$(NH_4)_6H_2W_{12}O_{40} \cdot xH_2O$] were weighed out and dissolved in deionized water bringing the volume to 130 cc. This was added to 202.09 grams of 14–35 mesh Tyler grade gamma-$Al_2O_3$ by the method of incipient wetness to create a catalyst containing approximately 10 wt. % $WO_3$. The impregnated catalyst was then dried overnight in air and calcined for 260 minutes at 1000° F. It was then divided into two equal parts and one-half was steamed at 1600° F. for 16 hrs. while the other was not. Both samples were submitted for surface area, pore volume and MAT activity and the results are shown below in Table I.

TABLE I

| | Support | Surface Area, BET[2] ($m^2$/gm) | Pore Volume, BET[2] (cc/gm) | MAT[1] 430° F.− Conversion (Wt. %) | $H_2$ Yield (Wt. %) |
|---|---|---|---|---|---|
| (A) | Unsteamed $WO_3/Al_2O_3$ | 187.7 | 0.440 | 54.5 | 0.69 |
| (B) | Steamed $WO_3/Al_2O_3$ | 89.0 | 0.463 | 44.6 | 1.11 |

[1]MAT is a microactivity test. See Oil and Gas Journal, 1966, Vol. 64, pages 7, 84, 85 and Vol. 2, 1971, pages 60–68.
[2]BET is the nitrogen adsorption method of Brunauer, Emmett and Teller shown in J. American Chemical Society, Vol. 16 (1938), pages 309–319.

As can be seen from Table I, steaming decreased the surface area to 89$m^2$/gm. MAT conversion decreased while hydrogen yield increased when the steamed support was used. It should be noted that the steamed and the unsteamed "supports" used in this test have catalytic properties although neither is a catalyst in accordance with the present invention.

Hydrogenation experiments were conducted using a hydrocarbonaceous feedstock having the inspection shown in Table II.

TABLE II

| Feedstock Inspection | |
|---|---|
| Gravity, API | 26.6 |
| Sulfur, ppm | 20 |
| Nitrogen, ppm | 0.4 |
| Carbon, Wt. % | 86.50 |
| Hydrogen, Wt. % | 13.32 |
| IR Absorbance (0.226 mm cell) | 0.518 |
| Distillation, °F. (D-86)[1] | |
| /5 Vol. % | 423 |
| 10/20 | 442/470 |
| 30/40 | 498/525 |
| 50/60 | 553/582 |
| 70/80 | 613/647 |
| 90/95 | 689/721 |
| FBP | 764 |

[1]D-86 converted to 15/5

EXAMPLE 1

Portions of the steamed and unsteamed supports A and B were loaded with palladium by first dissolving approximately 0.42 grams of $PdCl_2$ in 15 cc concentrated HCl and 15 cc deionized water and adding this to approximately 50 grams of support by the method of incipient wetness (to produce a catalyst containing approximately 0.5 wt. % Pd in both cases). Both catalysts were then calcined at 1000° F. for 1 hour. The 0.5% Pd on unsteamed $WO_3/\gamma$-$Al_2O_3$ is herein designated catalyst C and the 0.5% Pd on steamed $WO_3/\gamma$-$Al_2O_3$ (the catalyst of the present invention) is herein designated catalyst D. Each of these catalysts was then tested for hydrogenation activity in a batch, 300 cc autoclave using the feed of Table II. Run conditions were 200° C. (391° F.), 500 psig $H_2$ pressure, 100 cc feed and 10 grams catalyst. Small liquid samples were taken as a function of time and analyzed by infrared spectroscopy for aromatics content. The runs were identical except for the catalyst used. Results of the aromatic analyses, expressed as fractional aromaticity remaining, $(IR)/(IR)_o$, are given in Table III.

TABLE III

| Hydrogenation of Feed of Table II (200° C., 500 psi $H_2$, 1:10 cat:oil) | | |
|---|---|---|
| | $(IR)/(IR)_o$ | |
| Time (min). | Catalyst C | Catalyst D |
| 0 | 1.000 | 1.000 |

TABLE III-continued

Hydrogenation of Feed of Table II
(200° C., 500 psi H$_2$, 1:10 cat:oil)

| Time (min). | (IR)/(IR)$_o$ | |
|---|---|---|
| | Catalyst C | Catalyst D |
| 30 | 0.087 | 0.037 |
| 60 | 0.015 | 0 |
| 90 | 0 | 0 |
| 120 | 0 | 0 |
| 180 | 0 | 0 |
| 240 | 0 | 0 |

As can be seen, catalysts C and D rapidly decreased the aromatics content but catalyst D, which was a catalyst in accordance with the present invention, was more active.

EXAMPLE 2

To observe intermediate conversion levels, an additional test was carried out at 175° C. using 100 cc of the feed of Table II and only 7.5 grams of each catalyst. Samples were again taken as a function of time and the results are shown in Table IV.

TABLE IV

Hydrogenation of Feed of Table I
(175° C., 500 psig H$_2$, 1:13.3 catalyst to oil)

| Time (min). | (IR)/(IR)$_o$ | |
|---|---|---|
| | Catalyst C | Catalyst D |
| 0 | 1.000 | 1.000 |
| 30 | 0.396 | 0.216 |
| 60 | 0.168 | 0.037 |
| 90 | 0.054 | 0 |
| 120 | 0.014 | 0 |
| 180 | 0 | 0 |
| 240 | 0 | 0 |

Again, as can be seen from Table IV, Catalyst D, which was a catalyst in accordance with the present invention) was superior in the hydrogenation tests.

What is claimed is:

1. A process for the hydrogenation of aromatic hydrocarbons, which comprises: contacting said aromatic hydrocarbons, at hydrogenation conditions, in a hydrogenation zone in the presence of added hydrogen and the substantial absence of an inorganic sulfur compound, with a catalyst comprising (a) a noble metal component of Group VIII of the Periodic Table of Elements, and (b) a steamed support comprising a transition metal oxide composited with a non-zeolitic inorganic oxide, said transition metal oxide being selected from the group consisting of tungsten oxide, niobium oxide and mixtures thereof, said support having been steamed at a temperature of 500° to 1200° C.

2. The process of claim 1 wherein said steamed support additionally comprises a metal oxide selected from the group consisting of tantalum oxide, hafnium oxide, chromium oxide, titanium oxide, zirconium oxide, and mixtures thereof.

3. The process of claim 1 wherein said non-zeolitic inorganic oxide is selected from the group consisting of clay, silica, alumina, silica-alumina, boria, magnesia and mixtures thereof.

4. The process of claim 1 wherein said non-zeolitic inorganic oxide comprises alumina.

5. The process of claim 1 wherein said Group VIII noble metal component is present in an amount ranging from about 0.1 to 10 weight percent, calculated as elemental metal, based on the total catalyst, and said transition metal oxide is present in an amount ranging from about 0.1 to 50 weight percent, calculated as the oxide thereof, based on the total catalyst.

6. The process of claim 1 wherein said steamed support has been produced by contacting the corresponding non-steamed support with steam at a temperature ranging from about 932° F. to about 2192° F. (500° C. to 1200° C.) prior to being composited with said noble metal component.

7. The process of claim 1 wherein said catalyst comprises palladium deposited on steamed tungsten oxide composited with alumina.

8. The process of claim 1 wherein said inorganic sulfur compound is hydrogen sulfide, and wherein said hydrogen sulfide partial pressure is less than about 0.5 psia.

9. The process of claim 1 wherein said hydrogenation conditions include a temperature ranging from about 200° to about 600° F., and a total pressure ranging from about 200 to about 2500 psia.

10. The process of claim 1 wherein said aromatic hydrocarbons are contained in a hydrocarbonaceous oil.

11. The process of claim 10 wherein said hydrocarbonaceous oil has an atmospheric pressure boiling point ranging from about 300° to about 1050° F.

12. The process of claim 10 or claim 11 wherein said hydrocarbonaceous oil comprises an organic sulfur contaminant and wherein prior to said hydrogenation, said hydrocarbonaceous oil is contacted with a hydrogen-containing gas at hydrorefining conditions to produce an effluent comprising a normally gaseous product containing H$_2$S and a normally liquid product comprising a hydrorefined oil having a decreased amount of organic sulfur, separating said vaporous product comprising said H$_2$S from said normally liquid product, and passing at least a portion of said hydrorefined oil to said hydrogenation zone.

* * * * *